UNITED STATES PATENT OFFICE.

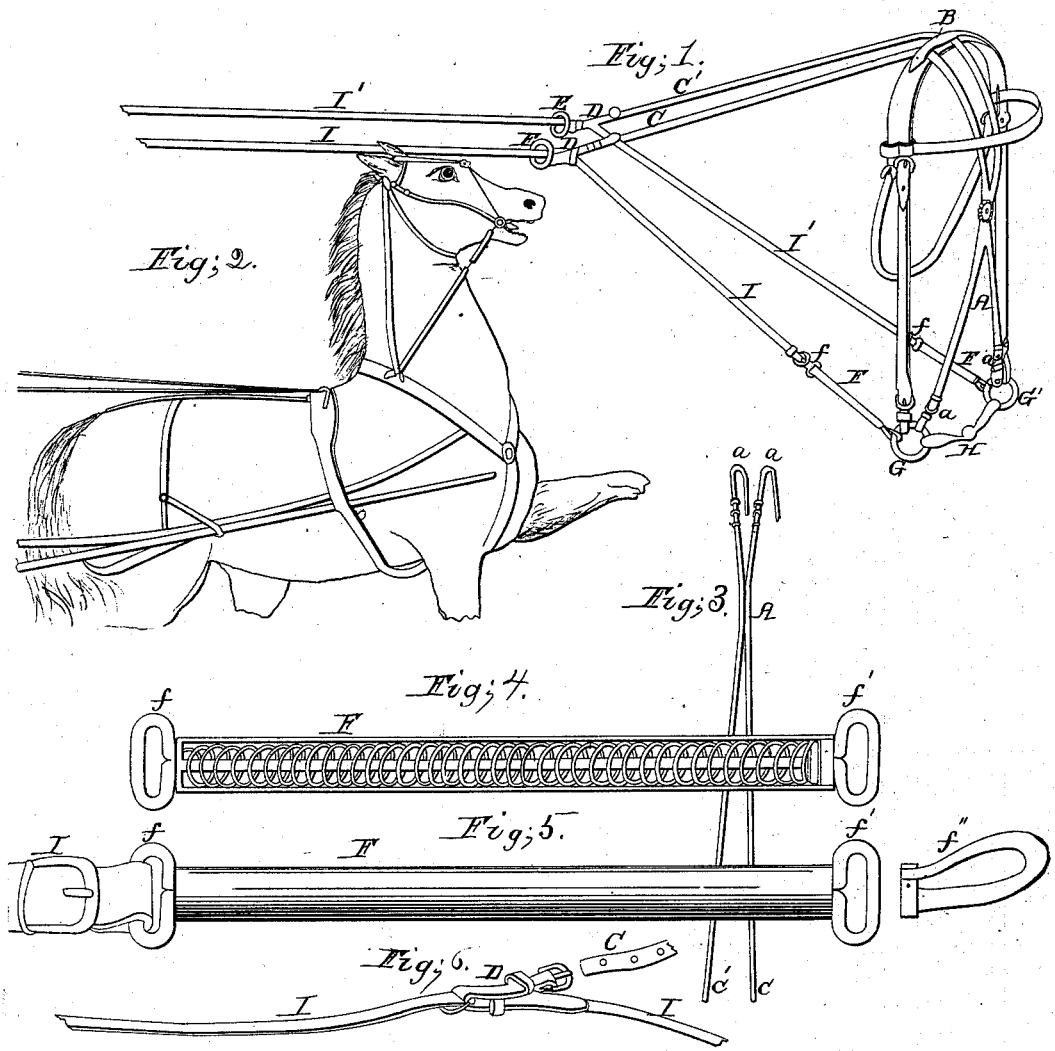

IMPROVEMENT IN BRIDLES.

GEORGE H. ALBRIGHT AND WILLIAM R. BURNS, OF LANCASTER, PENNSYLVANIA.

*Letters Patent No. 59,937, dated November 27, 1866.*

SPECIFICATION.

TO ALL WHOM IT MAY CONCERN:

Be it known that we, GEORGE H. ALBRIGHT, and WILLIAM H. BURNS, of Lancaster, in the county of Lancaster, and State of Pennsylvania, have invented a new and improved mode in the construction of Safety Bridles; and we do hereby declare that the following is a full, clear, and exact description of the construction and operation of the same, reference being had to the annexed drawings, making a part of this specification, in which—

Figure 1 is a view of an ordinary plain bridle, with our improvement applied.

Figure 2 shows the same, and its operation on the horse.

Figure 3 shows the face-piece A, and continued gag-reins $c$ $c'$, cut out of a single strap of leather, or formed in one piece.

Figure 4 shows the cylindrical case and spiral spring enclosed with the rod and loops.

Figure 5, the external casing of the spring and loops $f$ $f^2$, or snap-hook $f''$, with the line I attached to loop $f$.

Figure 6 shows the short strap and buckle D, on the common line I, for making the connections $c$ $c'$, of the extended face-piece A, and gag-reins $c$ $c'$.

The object of our invention is to simplify and at the same time to increase the power of the safety bridle, without any change made in the ordinary plain line and bridle, save the addition of prolonging the face-pieces into gag-reins, and consequently doing away with their use, and a short strap and buckle on the line, and spring casing to connect between the line and rings on the bit. The construction is so simple and the drawings so clearly show the parts, as to require very few words of description. The face-piece A, fig. 3, is formed of a single piece of good harness leather, say one and one-fourth inch wide, split to the length of nine inches down in front, with a buckle and billet, $a$ $a'$, to each, to be fastened to the rings, G G', of the bit H. These billets and lappings may be eight or nine inches long. An undivided portion of said face-piece, of three inches, is left, (A, fig. 3;) this may be covered with a neat ornament, coming on the forehead of the horse. The balance of the strap is split, say for forty inches, simply pierced for the insertion of the tongue of the buckle, on the short strap D, affixed to the line I. The divided strap is simply inserted under a loop-strap B, on the top of the crown-piece of the bridle, and carried back on each side of the neck of the horse, and buckled to the lines I, as shown. This single strap, split at both ends, (or when made of separate pieces and united, or passing through loops, independently,) being at one end attached to the rings of the bit, and the other end to the line over the top of the horse's head, where the fulcrum of power or leverage is the greatest; acting over the horse's face, instead of along the cheeks. Besides, this attachment, being made to the line behind the ring or loop, E, of the hames, where the two diverge, a further leverage is obtained by compressing this angle of divergency between said ring or loop, E, and no intervening appliance to said gag-rein and face-piece, thus united and attached to the rings of the bit, forming the ordinary face-piece, (however, heretofore never attached to the bit, that we know of,) and at the same time a substitute for the ordinary gag-rein, rather lessening the ordinary cost and labor on bridles, than otherwise. In order to relieve the horse from the action of the combined gag-rein and face-piece, we attach a spiral spring, F, encased in a cylinder, F, of sufficient length and power in the spring for ordinary use in guiding the horse. This is also connected to the rings of the bit at one end, and the spring-rod, with its loop $f$, to the end of an ordinary line, I. The operation is such, that any extra force applied to the line will cause the spring to yield and throw the action of the pull upon the gag-reins and face-piece, C A, and draw the bit upwards in the horse's mouth, in a more effectual manner, there being no friction or side action to overcome, and the leverage so powerful as to require but little force to bring the most obstinate horse into subjection.

I am aware that various devices are employed to the same end, such as connecting a combined throat-latch and face-piece with the bit, and forming double connections from the lines to the rings of the bit, with or without the intervention of gum-elastic, either combined with leather billets, or tubular snap and ring case, as well as double lines; all of which, however, differ substantially, in their action being connected with the cheek-piece or its substitute, and when connected with a face-piece, combined with the throat-latch; all of which modes of construction we disclaim, believing that the changes of the weather will seriously interfere with the action of the gum-elastic. Severe cold induces a stiffness, and great heat a flaccidity that, to say the least, makes it unreliable, not to mention its impaired functions on exposure and action for a season, encased in leather or exposed to rain and sunshine; so that we do not deem it equivalent to our spring, encased and secured from dust and water, made of proper metallic materials, besides being a still more simple attachment than when made of gum and encased in the leather ends forming part of the bridle, and unitedly passed through the rings of the bit. Nor is our branch, (as it may be deemed,) acting directly over the horse's head, substantially the same as when both branches, (however long or short,) are directly connected at the horse's mouth, either into the rings of the bit unitedly, or separately to the rings of the bit and rings of the cheek-piece or safety strap.

What we claim as our invention, and desire to secure by Letters Patent, is—

The construction and combination of the gag-reins $c\ c'$, face-pieces A, passing over the horse's head, one branch thereof connected to the bit by the cased spring F, when the united branches arise from the single bit, and unitedly connected with an ordinary line and bridle, in the manner and for the purpose specified.

GEORGE H. ALBRIGHT,
WM. R. BURNS.

Witnesses:
    W. B. WILEY,
    JACOB STAUFFER.